(12) United States Patent
Fried

(10) Patent No.: US 7,496,444 B1
(45) Date of Patent: Feb. 24, 2009

(54) NEAR ROUTE INTERACTIVE MAP SEARCH

(75) Inventor: Eric Philip Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,275

(22) Filed: Mar. 10, 2008

(51) Int. Cl.
*G01C 21/00* (2006.01)

(52) U.S. Cl. ........................................ 701/201; 340/988

(58) Field of Classification Search ......... 701/200–214, 701/23–26; 342/357.01, 357.06, 357.07, 342/457; 340/988, 995.19, 995.21, 995.22, 340/995.23
See application file for complete search history.

(56) References Cited

U.S. PATENT DOCUMENTS

| | | | |
|---|---|---|---|
| 5,983,158 A | 11/1999 | Suzuki et al. | |
| 6,128,571 A | 10/2000 | Ito et al. | |
| 6,346,893 B1 * | 2/2002 | Hirano et al. | 340/995.23 |
| 6,477,460 B2 * | 11/2002 | Kepler | 701/209 |
| 6,728,636 B2 * | 4/2004 | Kokojima et al. | 701/211 |
| 2001/0021895 A1 | 9/2001 | Yamazaki | |
| 2006/0142940 A1 | 6/2006 | Choi | |

FOREIGN PATENT DOCUMENTS

| | | |
|---|---|---|
| EP | 0803708 A2 | 10/1997 |
| WO | WO2005032177 A1 | 4/2005 |

\* cited by examiner

*Primary Examiner*—Dalena Tran
(74) *Attorney, Agent, or Firm*—Max Value IP, LLC

(57) ABSTRACT

An embodiment of this invention allows the user to search for entities nearest to a defined route. To search around a specific route, instead of expanding the search radii (r) to incorporate the whole route (the number of hits to cull increases as $\pi r^2$), the search is repeated automatically at various points along the route. Various features are also added in different embodiments, for searching and user-interface.

1 Claim, 2 Drawing Sheets

NEAR ROUTE INTERACTIVE MAP SEARCH

BACKGROUND OF THE INVENTION

Map search tools, such as yp.yahoo.com, mapquest.com, and maps.google.com, allow searching for entities (e.g., businesses such as "sandwich shops") "near" a known point (e.g., an address or a zip code). They even allow one to construct multi-point routes —as long as one knows all of the points on the route. A user may want to know where the sandwich shops are most convenient to the user's commute from office to home. However, with existing known solutions, the user has to search for sandwich shops nearest the office, then nearest home, do some manual number crunching, and then pick one. This manual process is difficult and time consuming (on an order between linear and quadratic) as the distance between the starting and ending points increases.

SUMMARY OF THE INVENTION

An embodiment of this invention allows the user to search for entities nearest to a defined route. To search around a specific route, instead of expanding the search radii (r) to incorporate the whole route (the number of hits to cull increases as $\pi r^2$), the search is repeated automatically at various points along the route (with number of hits increases as 2 r).

In one embodiment, the user experience is as follows:

1) Define your route by entering at least one starting and one ending point.

2) Enter your search terms as in existing interfaces.

3) Receive a list of hits, sorted by proximity to the defined route.

DETAILED DESCRIPTION OF THE PREFERRED EMBODIMENTS

Figure 1:
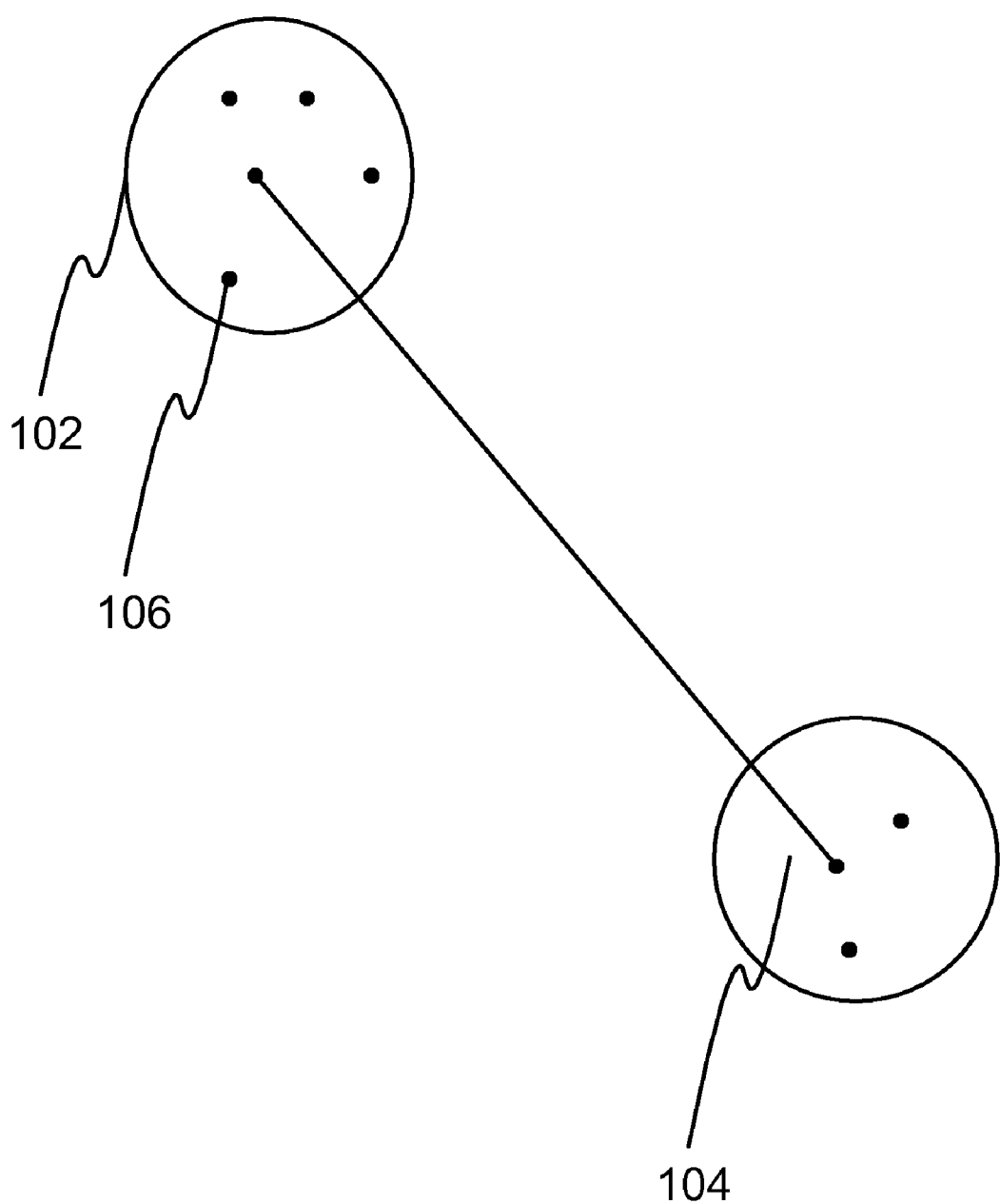
FIG. 1 is a schematic diagram of the map search tools.

In an embodiment of the invention, the algorithm accepts an ordered list of at least two route points (e.g., 200, 202, 204, 205, 206) and uses certain tunable parameters (212, 210), which may be constant values defined in the system, parameters passed to the function, etc.

(1) Generate a list of hits (e.g., 207, 208, 214, 219, 220)

(a) Initialize:

(i) An empty list. Each element is a tuple comprising (hit location (e.g., 207), proximity-to-route).

(ii) previouspoint (a loop variable) to the startpoint (200) of the route.

(iii) searchpoint (a loop variable) to the startpoint (200) of the route.

(iv) nextpoint (a loop variable) to the route point following startpoint in the input list (202).

(b) From the searchpoint, perform a search of a predefined tunable radius r (210) using existing techniques to generate a temporary list of hits.

(c) For each hit (e.g., 207) thus generated, calculate the proximity-to-route =distance (previouspoint (202) to hit (207))+distance (hit (207) to nextpoint (204))—distance (previouspoint (202) to nextpoint (204)).

(d) Add the temporary list of hits (e.g., 207, 208) and proximity-to-route measurements to the master list from (a) (i) step.

(e) Update loop variables:

(i) searchpoint: traverse a tunable percentage of 2 r (212) along the route from the current searchpoint (e.g., 209)

(ii) If searchpoint passes the last route point (206), terminate.

(iii) If searchpoint passes a route point (e.g., 204 or 205), other than the last route point (206), update previouspoint (202) to that route point (204 or 205, respectively) and nextpoint (204) to the subsequent route point (205 or 206, respectively).

(f) Loop to (b)

(2) Sort the list, by ascending proximity-to-route calculated in (1) (c), and present the list to the user.

A further embodiment incorporates these additional features:

Saving frequently-used routes.

Selecting only a part of the route to search—the bounds of the selection become the endpoints (e.g., 200 and 206) in the algorithm.

Weigh proximity-to-route values by how early/late in the route they appear. (e.g., in one scenario, if a user intends to buy an ice cream, the weight toward the destination is increased, so the ice cream would not melt by the time user gets to the destination.)

An embodiment of the invention addresses the problem use of the map search tools (FIG. 1). In one embodiment, map search tools allow searching for entities (e.g., businesses such as "sandwich shops") "near" a known point (e.g., an address or a zip code). They even allow one to construct multi-point routes (102 and 104), as long as one knows all of the points on the route. A user may want to know where the points of interest (106) are most convenient to the user's commute from office to home. However, with existing known solutions, the user has to search for points of interest (106) nearest the office, then nearest home, do some manual number crunching, and then pick one.

Figure 2:
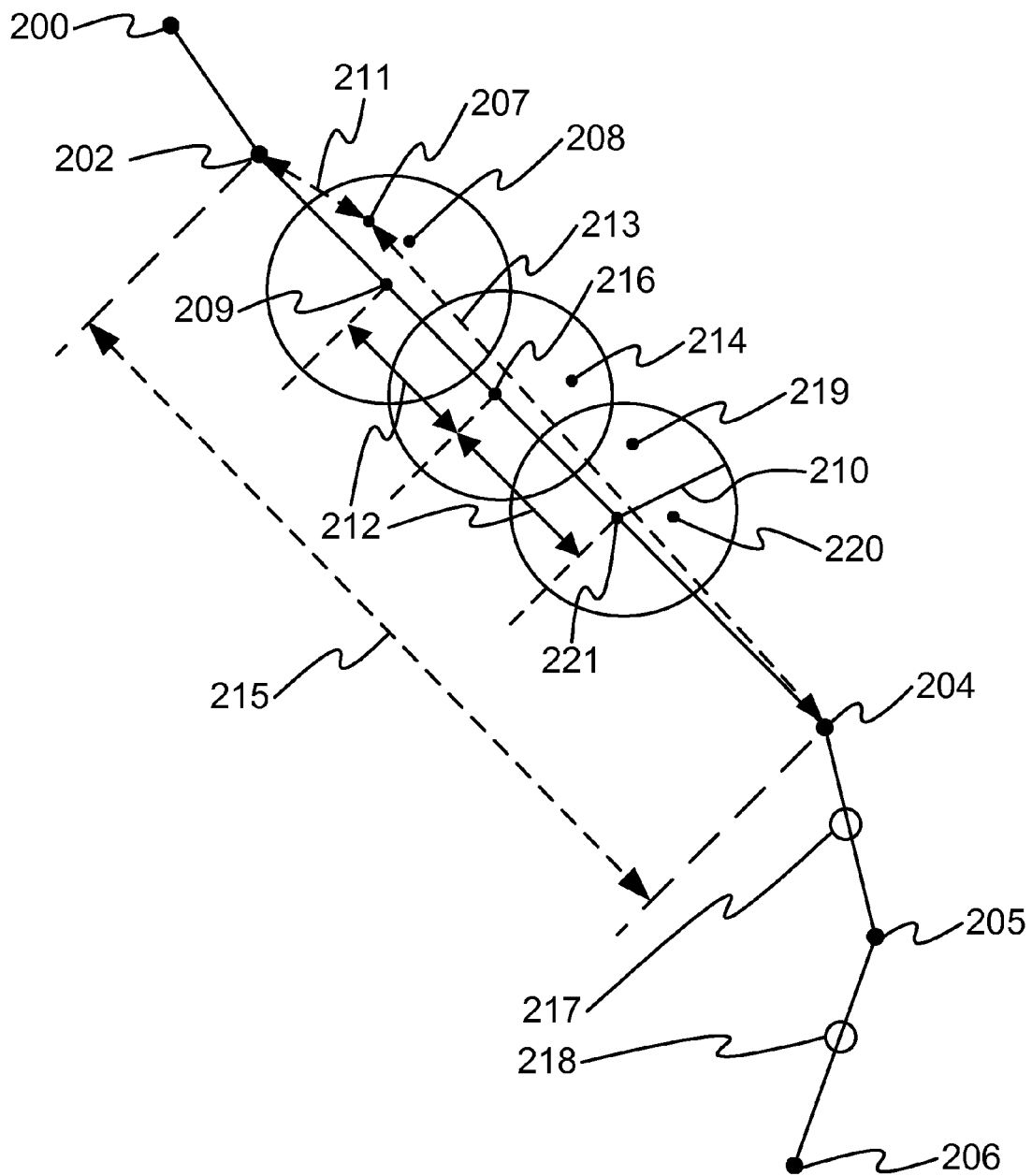
FIG. 2 is a schematic diagram, showing route interactive map search.

FIG. 2 is a schematic diagram illustrating an embodiment showing route interactive map search. This diagram shows a portion between Start point (200) and End point (206) of the route selected for search for points of interest (e.g., 207, 208, 214, 219, 220). When incrementing the search point forward (e.g., 209, 216, 221, 217, 218), if the search point (e.g., 217) goes past the current Next Point (e.g., 204), the Previous Point (202) is updated to become the current Next Point (204), and the Next point (204) is updated to next route point (205) in the portion of the route after the current Next Point (but not past the end point (206)). To search around a specific route, instead of expanding the search radii (r (210)), to incorporate the whole route, the search is repeated automatically at various points (e.g., 209, 216, 221, 217, 218) along the route (with number of hits increases relative to 2 r(212)).

One embodiment of the invention is a method of finding near-route points of interest (e.g., 207, 208, 214, 219, 220), the method comprising: a user selecting a portion of a route; wherein the portion of the route has a start point (200) and an end point (206) located on the route; wherein the portion of the route comprises an ordered list of route points (200, 202, 204, 205, 206) located on the portion of the route and inclusive of the start point (200) and the end point (206);

automatically searching for the near-route points of interest within a user configurable radius (210) around a first searching point (209) located on the portion of the route ((202) to (204)); wherein if the searching step is successful, a search result from the searching step comprises one or more tuples; wherein a first tuple of the one or more tuples comprises a first hit location (207) and a first proximity-to-route; wherein the first hit location (207) is associated with a first point of interest (207) of the near-route points of interest (e.g., 207, 208, 214, 219, 220); wherein the first proximity-to-route is determined by adding a first distance (211) from a first previous point (202) to the first hit location (207) and a second distance (213) from the first hit location (207) to a first next point (204) and subtracting a third distance (215) from the first previous point (202) to the first next point (204); wherein the first previous point (202) and the first next point (204) are in the ordered list of route points (200, 202, 204, 205, 206), and the next first point (204) is a next point after the first previous point (202) in the ordered list of route points (200, 202, 204, 205, 206); wherein the first searching point (209) is located between the first previous point (202) and the first next point (204);

adding the one or more tuples to a tuple cumulative list;

automatically traversing the first searching point (209) by a user configurable search traverse amount (212) to a second searching point (216) along the route in a forward direction; wherein the forward direction is from the start point (200) toward the end point (206);

if the second searching point (e.g., 217 or 218) is located after the first next point (204) in the forward direction along the portion of the route, then traversing the first next point (204) to a second next point (205 or 206, respectively) on the ordered list (200, 202, 204, 205, 206) of route points, and traversing the first previous point (202) to a second previous point (204 or 205, respectively) located on the ordered list of route points, just before the second next point (205 or 206, respectively); wherein the second next point (205 or 206, respectively) is on or after the second searching point (217 or 218, respectively) in the forward direction along the portion of the route; wherein the second next point (205 or 206, respectively) has maximum number of points separation from the end point (206) within the ordered list (200, 202, 204, 205, 206) of route points;

associating a first weight to the first tuple, based on a distance from the start point (200) to the first hit location (207) and a distance from the first hit location (207) to the end point (206);

sorting the tuple cumulative list to a sorted tuple cumulative list, based on a second weight associated to each second tuple of the one or more tuples and a second proximity-to-route of the second tuple; and displaying the sorted tuple cumulative list to the user.

A system, apparatus, or device comprising one of the following items is an example of the invention: UT, map, map display, keyboard, mouse, search engine, car, attaching device, GUI, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of navigation and map/driving/search/tourist tool/ management.

Any variations of the above teaching are also intended to be covered by this patent application.

The invention claimed is:

1. A method of finding near-route points of interest, said method comprising:

a user selecting a portion of a route on a user interface;

wherein said potion of said route has a start point and an end point located on said route;

wherein said portion of said route comprises an ordered list of route points located on said portion of said route and inclusive of said start point and said end point;

automatically searching for said near-route points of interest within a user configurable radius around a first searching point located on said portion of said route, by using a search engine;

wherein if said searching step is successful, a search result from said searching step comprises one or more tuples;

wherein a first tuple of said one or more tuples comprises a first hit location and a first proximity-to-route;

wherein said first hit location is associated with a first point of interest of said near-route points of interest;

wherein said first proximity-to-route is determined by adding a first distance from a first previous point to said first hit location and a second distance from said first hit location to a first next point and subtracting a third distance from said first previous point to said first next point;

wherein said first previous point and said first next point are in said ordered list of route points, and said first next point is a next point after said first previous point in said ordered list of route points;

wherein said first searching point is located between said first previous point and said first next point;

adding said one or more tuples to a tuple cumulative list;

automatically traversing said first searching point by a user configurable search traverse amount to a second searching point along said route in a forward direction;

wherein said user configurable search traverse amount is a percentage of twice of said user configurable radius;

wherein said forward direction is from said start point toward said end point;

if said second searching point is located after said first next point in said forward direction along said portion of said route, then traversing said first next point to a second next point on said ordered list of route points, and traversing said first previous point to a second previous point located on said ordered list of route points just before said second next point;

wherein said second next point is on or after said second searching point in said forward direction along said portion of said route;

wherein said second next point has maximum number of points separation from said end point within said ordered list of route points;

associating a first weight to said first tuple based on a distance from said start point to said first hit location and a distance from said first hit location to said end point;

sorting said tuple cumulative list to a sorted tuple cumulative list based on a second weight associated to each tuple in said tuple cumulative list and a second proximity-to-route of said each tuple in said tuple cumulative list; and displaying said sorted tuple cumulative list to said user on a display device.

* * * * *